Oct. 13, 1925.

M. WINTERS 1,556,887

DOUGH ROLLING MACHINE

Filed Aug. 30, 1924

INVENTOR
May Winters.
BY
Ralph Burch
ATTORNEY.

Patented Oct. 13, 1925.

1,556,887

UNITED STATES PATENT OFFICE.

MAY WINTERS, OF BURGOON, OHIO.

DOUGH-ROLLING MACHINE.

Application filed August 30, 1924. Serial No. 735,137.

*To all whom it may concern:*

Be it known that I, MAY WINTERS, citizen of the United States, residing at Burgoon, in the county of Sandusky and State of Ohio, have invented certain new and useful Improvements in Dough-Rolling Machines, of which the following is a specification.

My invention relates to improvements in dough rollers and particularly to a dough rolling machine designed to more efficiently and rapidly roll out dough.

The primary object of the invention is to provide a longitudinally movable roller supported by a carriage and means for moving the roller and imparting a rotary movement thereto.

A further object of the invention is to provide a roller supported by a vertically adjustable carriage whereby the dough may be rolled to any desired thickness.

Another object of the invention is to provide a machine of the above-mentioned character which is simple and durable in construction, reliable in operation and inexpensive to manufacture.

Other objects and advantages of the invention will be apparent during the course of the following description.

Figure 1:
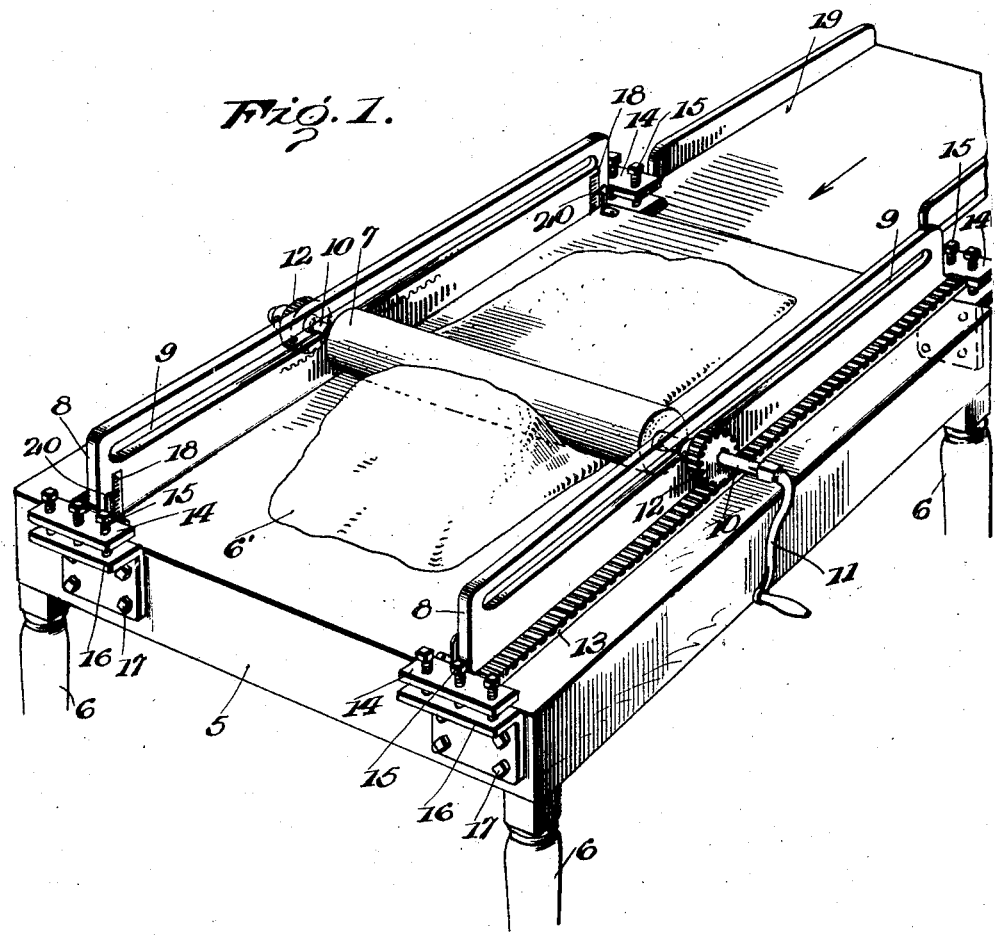
Figure 2:
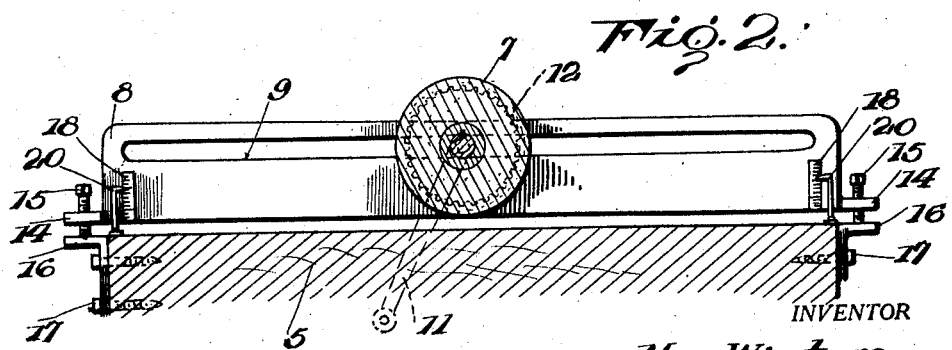

In the accompanying drawing forming a part of this specification and in which like numerals are employed to designate like parts throughout the same, Figure 1, is a perspective view of the machine, and, Figure 2, is a central longitudinal sectional view of the same.

In the drawing, wherein for the purpose of illustration I have shown a preferred embodiment of my invention, the numeral 5 designates the top of a table supported by the legs 6, which acts as a base for my machine to receive the dough 6' although any other suitable base may be provided.

The carriage supporting the roller 7 consists of longitudinal side pieces 8 arranged in spaced parallel relation. Each side piece 8 is provided with a longitudinal slot 9 adjacent the upper edge thereof, to receive the axles 10 at each end of the roller 7 permitting revolving and longitudinal movement of the same. The axles 10 are removably fitted in the ends of the roller and extend a substantial distance beyond the side pieces 8, one of the axles having a crank 11 attached to its end for imparting a rotary movement to the axles. A cog wheel 12 is rigidly mounted on each of the axles 10 outside of the side pieces 8 and mesh with the teeth of the longitudinal rack bar 13 formed integral and extending laterally from the lower edge of the side pieces 8 of the carriage. Thus, it is seen that by reason of the rotary movement imparted to the axles through the medium of the crank 11, the roller will be moved backward and forward the length of the carriage.

In order that the dough may be rolled any desired thickness the carriage is mounted so as to be vertically adjustable with respect to the base. Each side piece 8 has a cross plate 14 projecting from each end, the cross plates each having three screw threaded openings to receive the screw threaded adjusting screws 15 and the ends of the screws bear upon the upper base of the angle plates 16, secured to the ends of the base or table top 5 by bolts 17 or other suitable fasteners. Thus, it is seen that adjustment of the screws 15 will lower or elevate the carriage supporting the roller and to insure accurate adjustment of the carriage a scale 18 having graduations thereon is secured to the inside of the side pieces 8 and a pointer 20 attached to the base 5 is associated therewith to indicate the distance between the base and roller, so the dough may be rolled the proper thickness. The extension 19 is for feeding the dough to the machine.

In operation, the dough is placed on the base and by turning the crank the roller will be moved forward and backward rolling out the dough. To roll the dough the desired thickness the carriage supporting the roller may be lowered or elevated by adjusting the screws 15 and the scale 18 will indicate the distance of the adjustment. Thus, it is seen a machine is provided which will much more rapidly and efficiently roll out dough than the method now in use.

It is to be understood that the form of my invention herewith shown and described is to be taken as a preferred example of the same, and that certain changes in the shape, size and arrangement of parts may be resorted to without departing from the spirit of the invention or the scope of the subjoined claims.

Having thus described my invention, I claim:—

1. A machine of the character described comprising a base, spaced side pieces extending longitudinally of the base having longitudinal slots near the upper edge, a roller having a stub axle at each end extending through said slots of the side pieces, a rack bar secured to the outside of each side piece at the lower edge being disposed at right angles thereto, pinion gears mounted on the axles of said roller adapted to mesh with said rack bars, a crank for turning said roller and means for vertically adjusting said side pieces with respect to said base.

2. A machine of the character described comprising a base, spaced side pieces extending longitudinally of the base having longitudinal slots near their upper edge, a horizontal cross plate connected to each end of said side pieces having a series of screw threaded openings therethrough, a plurality of screws mounted in said openings, bearing plates attached to said base, beneath said cross plates, with which the screws are adapted to contact to adjustably support said side pieces, a roller having a stub axle at each end extending through the slots of said side pieces, a rack bar secured to the outside of said side pieces near the lower edge thereof, pinion gears mounted on said axles adapted to mesh with said rack bars, and a crank for turning said roller.

In testimony whereof I affix my signature.

MAY WINTERS.